Figure 1:
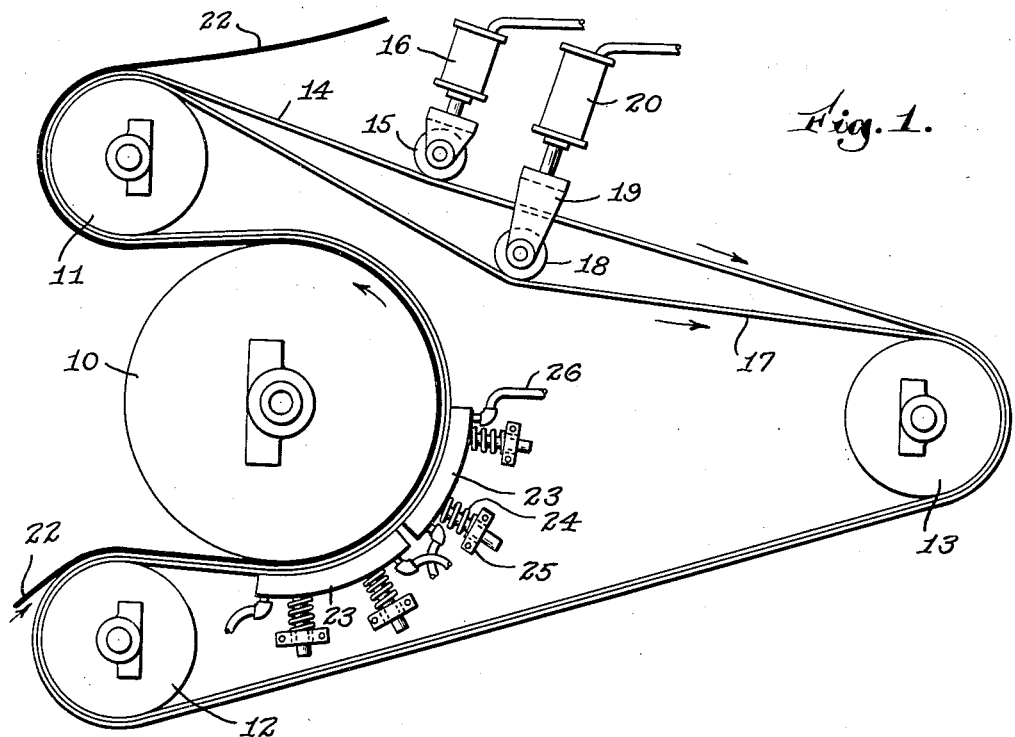

Dec. 5, 1939.    J. M. BIERER    2,182,168
VULCANIZING MACHINE
Filed June 3, 1936

Inventor
John M. Bierer.
by Kenway & Witter
Attorneys

Patented Dec. 5, 1939

2,182,168

UNITED STATES PATENT OFFICE 2,182,168

VULCANIZING MACHINE

John M. Bierer, Waban, Mass., assignor to Boston Woven Hose & Rubber Company, Cambridge, Mass., a corporation of Massachusetts Application June 3, 1936, Serial No. 83,259

3 Claims. (Cl. 18—6)

This invention relates to machines of the type employing a heated drum in combination with a metallic pressure band for vulcanizing or curing rubber or rubberized products, such, for example, as belting or matting. It is advantageous in some cases to subject the material to be vulcanized to greater pressure in its passage about the drum than can be applied practicably or conveniently by the tension of a single band. Accordingly, the present invention contemplates reinforcing the pressure band or supplementing its effective pressure by means of an auxiliary band arranged to make continuous contact with the pressure band substantially throughout its path of engagement with the work. The auxiliary band is herein shown as provided with independent mechanism by which its tension may be controlled and adjusted. The range and capacity of the machine may be thus increased without the necessity of carrying the tension of the pressure band to a dangerously high degree and a more flexible manner of pressure control is made available.

The auxiliary band may be of substantially the same material as that used in the pressure band or it may be of a different character or material. It is preferred, however, to employ an auxiliary band of substantially the same strength and flexibility as the pressure band, since under these conditions the contact of engagement between the two bands is more close, continuous and effective and the organization may be made more compact in mechanical arrangement.

An important advantage incident to the use of an auxiliary band of this type is that it permits the employment of segmental heaters in close proximity to the circumference of the vulcanizing drum, the heat being transmitted efficiently through the superposed tensioned belts to the surface of the material which is outermost upon the vulcanizing drum.

In another aspect my invention consists in the combination with a band-encircled vulcanizing drum of heaters or a heater arranged to be yieldingly maintained in contact with the outer face of the pressure band in the vulcanizing area. In treating such material as belting it has been found very advantageous to heat the material from both surfaces in the vulcanizing operation and heretofore heating jackets have been provided in spaced concentric relation with the vulcanizing drum. Improved results, however, may be secured by arranging a heater for free movement in a generally radial direction in respect to the drum, and maintaining the heater yieldingly in actual contact with the band or bands tensioned about the circumference of the drum. Preferably and as herein shown, the heater may take the form of segmental sections each independently mounted and yieldingly urged toward the vulcanizing drum. It is to be noted that such a heater may be employed with advantage in machines operating with a pressure band only, although it is capable of efficient operation also in a machine operating with a pressure band supplemented by an auxiliary tension band as in the organization herein illustrated.

Figure 2:
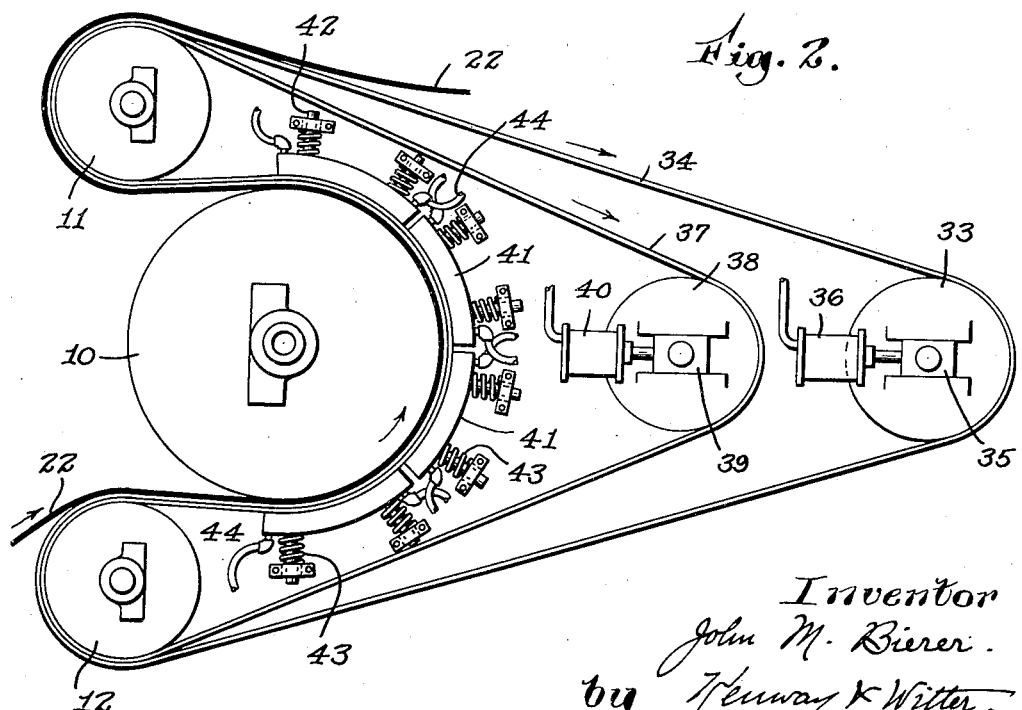

These and other features of the invention will be best understood and appreciated from the following description of two preferred embodiments thereof selected for purposes of illustration and shown in the accompanying drawing in which, Fig. 1 is a diagrammatic view of the elements of the machine in operative relation, and Fig. 2 is a similar view showing a somewhat different arrangement of the auxiliary band.

The apparatus is shown in Fig. 1 in more or less diagrammatic manner. The machine frame in which all the drums are journaled is omitted for the sake of clearness and the heated vulcanizing drum 10 is represented in its operative relation to the guide drums 11, 12 and 13. The latter are arranged so as to guide the pressure band 14 in a substantially three sided course including a loop which passes about somewhat more than 180° of the circumference of the drum 10. The material 22 to be vulcanized is fed in sheet or strip form to the lower side of the drum 10, thence about the inner portion of its circumference and finally it is led away from the upper side of the drum. During its passage about the drum it is heated and engaged under severe pressure by the belt 14 which, for that purpose, is maintained under tension by a tension roll 15 mounted in a movable yoke which is advanced by hydraulic pressure made effective through a cylinder 16, that is, the tension roll 15 is continually urged downwardly in a path substantially normal to the direction of travel of the band 14 and thus maintains it under continuous tension.

As already intimated, it is impractical to impart sufficient tension to the band 14 to develop the pressure of engagement requisite for compacting or molding certain classes of goods and in the machine shown in Fig. 1 the pressure of the band 14 is supplemented by the pressure of an auxiliary band 17 which is arranged to run over the same guide drums 11, 12 and 13 which control the course of the pressure band 14, but is provided with separate mechanism for regulating and controlling the tension thereof. As herein shown, this may be effected by a tension roll 18 mounted in a yoke member 19 and tensioned by hydraulic pressure made effective through the cylinder 20. In this instance the yoke 19 is of sufficient width and length to straddle the pressure band 14 and permit the latter to pass freely between its arms.

It will be noted that the auxiliary band 17 passes over the guide drums 11 and 12 in position between the drums and the pressure band 14, but that when the vulcanizing drum 10 is reached, the auxiliary band 17 is located outside the pressure band 14, traveling in a coextensive path with it about somewhat more than 180° of the circumference of the drum. By supplying the cylinders 16 and 18 with fluid under an equal degree of pressure, the two bands may be subjected to substantially the same degree of tension, and practically double the pressure made effective upon the material 22 that could otherwise be derived from a single band. As the tension rolls 15 and 18 are arranged to be separately controlled, however, the tension in the two bands may be regulated as desired and need not be equal.

The machine of Fig. 1 is shown as equipped with segmental heaters 23 which are arranged to be maintained in yielding engagement with the auxiliary tension band 17 over an area in the coextensive path of the two bands about the circumference of the vulcanizing drum. The effect of these heaters is to heat the bands and thus subject the material to heat from that surface which is outwardly disposed on the drum 10 during the vulcanizing operation. The fact that both the bands 14 and 17 are thin metal and are held in firm and continuous contact with each other throughout the area of contact of the material 22 with the band 14 renders the transmission of heat to the outer surface of the material efficient and uniform.

As indicated the heaters 23 may be segmental or concave in general shape and may be arranged to jacket that portion of the vulcanizing drum 10 about which the material 22 extends. For the sake of clearness only two heaters are shown in Fig. 1. These may be movably supported upon brackets 25 by guide rods fitting loosely into the brackets and urged inwardly at all times by compression springs 24 encircling the guide rods. The heaters may include a single steam chamber or a manifold of piping and are provided with flexible steam connections 26 by which they may be maintained under a uniform degree of heat during the operation of the machine.

In Fig. 2 is illustrated a somewhat different arrangement of the pressure and auxiliary bands. As in the apparatus already described the pressure band 34 is arranged to extend in an open loop about a substantial portion of the circumference of the vulcanizing drum 10, being guided in its course by guide drums 11, 12 and 33. In this case the bearings of the guide drums 11 and 12 are fixed, while the rearmost guide drum 33 is mounted in adjustable bearings 35 and is urged rearwardly under hydraulic pressure made effective through cylinders 36 so as to maintain at all times the desired degree of tension in the band.

The auxiliary band 37 in this case is guided over a drum 38 which is journaled inside the path of the tension band 34 in movable bearings 39 and urged rearwardly at all times by hydraulic pressure effective through cylinders 40. The auxiliary band 37 passes about the guide drum 12 between it and the pressure band 34, and then passes about the circumference of the vulcanizing drum 10 with the pressure band 34 interposed between it and the material. That is to say, the auxiliary band backs up and reinforces the pressure band 34 throughout its entire path of engagement with the material 22 upon the vulcanizing drum.

The apparatus of Fig. 2 is shown as equipped with a series of segmental heaters 41, supported by brackets 42 and urged continuously into contact with the outer face of the tension band 37 by compression springs 43. Steam connections 44 are provided for maintaining the heaters at the requisite degree of temperature.

I claim:

1. A continuous vulcanizing machine having a heated vulcanizing drum, a pair of thin sheet metal bands passing about an arcuate portion of the drum and arranged to travel in superposed relation upon material located at said arcuate portion of the drum beneath the bands, a movable heater, and means yieldingly holding the heater in contact with the outer band of the pair at said arcuate portion thereof.

2. A continuous vulcanizing machine having a heated vulcanizing drum, a pressure band passing about an arcuate portion of the drum and arranged to maintain the material to be vulcanized under pressure upon said portion of the drum, an auxiliary pressure band engaging said arcuate portion of the first-named pressure band, a movable heater comprising a plurality of independent segments, and independent resilient means for each segment acting to hold the heater in contact with said arcuate portion of the auxiliary band.

3. A continuous vulcanizing machine having a heated vulcanizing drum, a pair of thin sheet metal bands each of uniform thickness throughout its length passing in superposed relation about an arcuate portion of the drum and arranged to travel in superposed relation upon material located at said arcuate portion of the drum beneath the bands, a heater mounted for movement toward and from the drum and having an arcuate surface corresponding to and facing said arcuate portion of the drum, and means for moving the heater toward the drum and holding its said arcuate surface in contact with the outer face of the outer band at said arcuate portion of the drum.

JOHN M. BIERER.